Nov. 1, 1966 W. H. LOHMEYER 3,283,215
ELECTRICAL FUSE-DISCONNECT SWITCH BOXES
Filed Oct. 21, 1964

INVENTOR.
WALTER H. LOHMEYER
BY
Arthur H. Robert
ATTORNEY

United States Patent Office 3,283,215
Patented Nov. 1, 1966

3,283,215
ELECTRICAL FUSE-DISCONNECT SWITCH BOXES
Walter H. Lohmeyer, 1620 Stevens Ave., Louisville, Ky.
Filed Oct. 21, 1964, Ser. No. 405,404
2 Claims. (Cl. 317—114)

Electrical fuse-disconnect switch boxes conventionally include a rectangular metal box mounted on a vertical wall and with its open front normally closed by a hinged door. A slate or other insulating panel is mounted in the box with its upper end adjacent to the top of the box. For each of two or more incoming power lines, this panel carries the following viz: (A) an upper end power-receiving terminal having one of two main switch contacts which must be closed for "power-on" purposes; (B) a lower end power-delivering terminal; (C) a removably mounted safety fuse with its lower end electrically connected to the power-delivering terminal and its upper end connected to the other one of said two main switch contacts which must be closed for "power-on" purposes; (D) a downwardly-opened upwardly-closed switch blade for electrically connected said two main switch contacts and thereby close the incoming circuit from the power-receiving terminal successively through the main switch and safety fuse to the power-delivering terminal; and (E) manually-operable box-mounted means for moving the blade back-and-forth between its upper switch-closed and lower switch-open positions, (1) said mounting means including a crank shaft which passes transversely through the interior of the box from one side wall to the other with one end terminating on the outer side of the box in a suitable crank arm.

When the incoming power lines extend downwardly toward the top of the switch box, the work (of passing them through the top of the box and electrically connecting them to their respective power-receiving terminals near the top of the panel) can be easily and quickly performed regardless of the size of the box or the size of each incoming power line. On the other hand, when the incoming power lines extend upwardly toward the bottom of the switch box, they must be passed upwardly through the bottom of the box, extended upwardly within the box to the top of the box and then reversely bent in a manner permitting them to be connected to their respective top power-receiving terminals the same as if they came through the top of the box.

Where the incoming power lines are quite small and highly flexible, their bottom entries present no great problem. However, as the incoming power lines become progressively larger and stiffer, they are progressively more difficult to bend. In such cases, the larger incoming power lines present an extremely difficult connection problem and the work involved often requires an unduly large amount of time. This problem cannot be solved by turning the switch panel and its elements upside-down because that would result in converting the fuse-disconnect switch to a downwardly-closing switch which does not meet underwriter requirements.

The principal object of the present invention is to provide a fuse-disconnect box which can be wired with equal facility when the power lines enter the top of the box in one case and the bottom of the box in another.

Another important object is to improve a fuse-disconnect box, which can be wired with one degree of facility when the power lines enter the top of the box, by providing it with simple and inexpensive means for converting it into a box which can be wired with the same degree of facility when the power lines enter the bottom of the box.

All of the objects of my invention can be achieved by arranging the switch box so that it can be mounted on a vertical wall either upright or upside-down and by providing that switch box with a transverse switch-blade-operating crank-shaft which can be selectively mounted in either of two positions, namely: (1) a first position in which the box is arranged upright and the transverse crank shaft is located below (the inner side of) said one main switch contact on the incoming power terminal; and (2) a second position in which the box is arranged up-side-down and said shaft is again located below (but now on the outer side of) said one and the same main switch contact on the incoming power terminal. In other words, for each pair of main switch contacts, the transverse crank shaft has a first position below the inner side of switch contact when the box is upright and a second position below the outer side of that same contact when the box is up-side-down.

My arrangement meets the underwriter requirements because, regardless of whether the power enters at the top or the bottom, it passes from the power-receiving terminal through an upwardly-closed, downwardly-open main switch to the safety fuse. Furthermore, with each movable switch blade of an upright box mounted on a single crank shaft located in its first position, the conversion of the box can be easily and quickly accomplished simply by mounting the entire box upside-down and transferring said crank shaft from its first position to its second position.

The invention is illustrated in the accompanying drawing wherein:

FIGS. 1–3 illustrate a fuse-disconnect box constructed in accordance with the preferred embodiment of my invention and arranged upright with its power incoming end at its top, FIG. 1 being a front elevational view of the open box with the switch in its closed "power-on" position, and FIGS. 2 and 3 being vertical, sectional and elevational views, respectively, taken along lines 2—2 and 3—3 of FIG. 1;

Conventional structure

Figure 1:
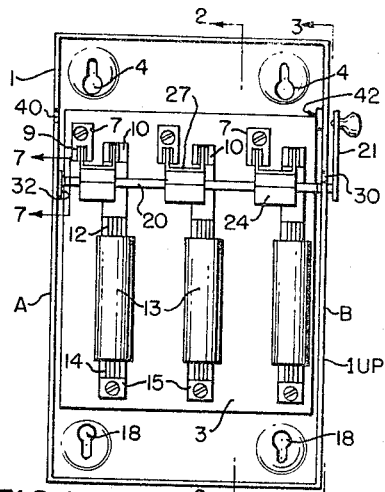

The electrical fuse-disconnect switch box illustrated conventionally includes a rectangular metal box 1 having an open front normally closed by a hinged or otherwise removably secured door or lid 2 and a slate or other insulating panel 3 mounted in the box 1 with its upper and lower ends respectively adjacent the top and bottom ends of the box. The switch box 1 has upper bolt holes 4 through which it is adapted to be conventionally mounted on a vertical building wall in upright fashion as desired in one installation where the incoming power lines approach the top side of the box.

The structure illustrated is also conventional to the extent that it includes the following elements mounted on panel 3, viz: a power-receiving terminal 7 at the upper end of the upright box 1; a pair of switch contacts 9 and 10, which must be electrically connected together for "power-on" purposes; a pair of fuse contacts 12 and 14 which are normally electrically connected through a safety fuse 13; and power-delivering terminal 15 is at the lower end of the upright box 1. The incoming power terminal 7 is electrically connected permanently to switch contact 9 and switch contact 10 is electrically connected permanently to fuse contact 12 while fuse contact 14 is electrically connected permanently to the power-delivering terminal 15.

Inventive structure

In accordance with my invention, the box is provided (a) with means for mounting the box on a vertical wall in up-side-down fashion so that it meets requirements of another installation where the incoming power lines approach the bottom end of the wall, (b) with a switch-blade assembly for electrically interconnecting and disconnecting the switch contacts 9 and 10, and (c) with means for mounting the switch-blade assembly in a first position below the inner side of the power contact 9 when the switch box is upright and in a second position below the outer side of that contact 9 when the switch box is up-side-down.

Box mounting means

Figure 2:
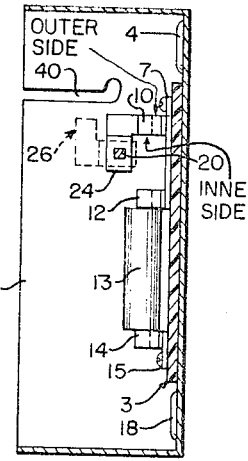
Figure 3:
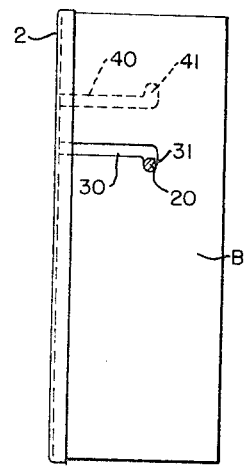

In order to mount the box 1 on a vertical wall in up-side-down fashion, it is provided with bolt holes 18 which are adjacent its lower end when the box is upright and adjacent its upper end when it is up-side-down. Thus, in FIGURES 1–3, the power-receiving end of the box constitutes the top end thereof while, in FIGURES 4–5, the power-receiving end constitutes the bottom end of the box. The bolt holes 4 are on the top end portion of the upright box while the bolt holes 18 are in that end portion which is uppermost when the box is up-side-down.

Switch-blade assembly

The specific construction of a given switch assembly depends upon the relative location of the switch contacts 9 and 10. Generally speaking these contacts may be either horizontally or vertically spaced from each other and aligned with each other in any suitable way. In either case, the switch-blade assembly for interconnecting and disconnecting them may be mounted on the box in any suitable way except that such assembly should be mounted on the inner side of the contact 9 in upright boxes (and on the outer side of contact 9 in up-side-down boxes) so as to close the switch contacts 9 and 10, in each case, upon upward movement of the switch blade and open them upon downward movement of the switch blade. In the preferred embodiment, the contacts 9 and 10 are horizontally spaced and aligned.

With a horizontally-spaced switch-contact arrangement, the switch-blade assembly may be described as comprising: a cross shaft 20 having one end terminating in a crank handle 21 and its opposite end provided with a retaining flange in the form of an annular disc 22; an insulating block 24 rigidly mounted on the cross shaft 20; and a switch blade 26, in the form of a U-shaped bridge member having one leg for engaging and disengaging contact 9 and the other leg for engaing and disengaing contact 10, this blade having its bight 27 rigidly mounted on the block 24.

Assembly mounting means

Figure 4:
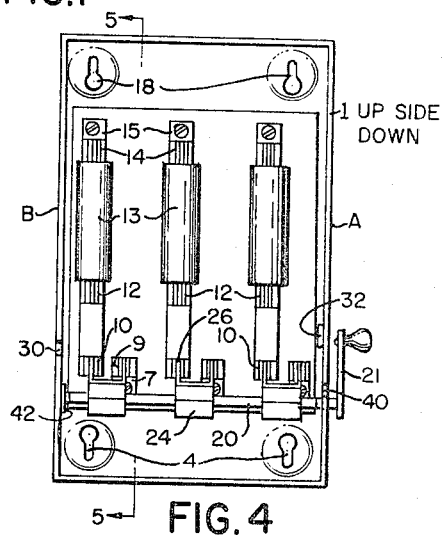
FIGS. 4–5 illustrate the same box arranged upside down with its power incoming end at its bottom, FIG. 4 being a front elevational view of the open box with the switch in its closed "power-on" position as in FIG. 1, and FIG. 5 being a vertical sectional view taken along lines 5—5 of FIG. 4 except that the switch is in its open "power-off" position.
Figure 5:
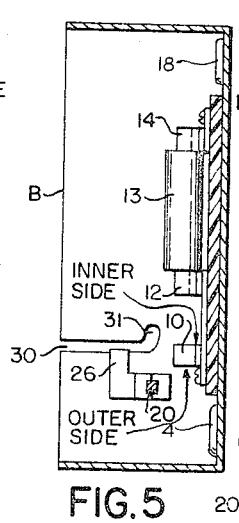
Figure 7:
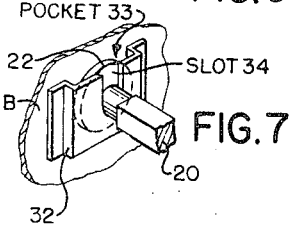
FIG. 7 is a detail showing how one end of the switch blade unit is removably mounted on the casing.
Figure 8:
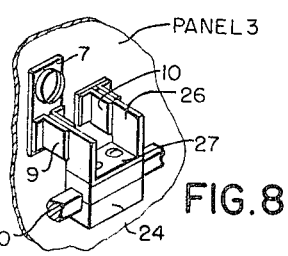
FIGS. 8 and 9 are fragmentary perspective views showing one switch blade of the switch blade unit in its closed position in FIG. 8 and in its open position in FIG. 9.
Figure 6:
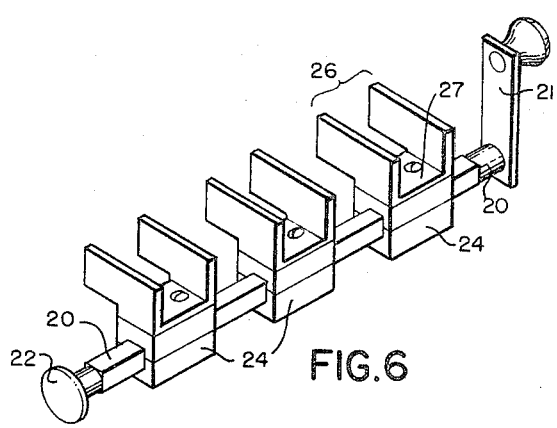
FIG. 6 is a perspective view of the switch blade unit.
Figure 9:
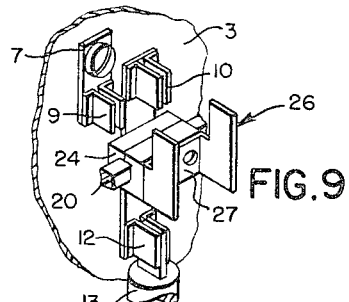

The assembly mounting means comprises: means for mounting the switch-blade assembly on the box 1 in a first position wherein, with the box upright, the cross shaft extends below that side of the power contact 9 which is its lower "inner" side as seen in FIG. 1; and means for mounting the switch blade assembly on the box 1 in a second position wherein, with the box up-side-down, the cross shaft extends below that side of the power contact 9, which is its lower "outer" side as seen in FIG. 4. In other words, the switch-blade assembly is mounted on one side or the other of power contact 9 but always below that contact.

In the first position, the axis of the cross shaft 20 is spaced downwardly from the inner lower side of contacts 9 and 10 and extends horizontally across the box from its A side to its B side.

The mounting means for the first position of the switch-blade assembly comprises: a horizontally-elongate slot 30 open at the front edge of the B side wall of the box 1 and extending rearwardly therefrom for a suitable distance where it terminates in a downwardly-turned end portion 31; and a U-shaped strap 32 secured to the inner face of side wall A to form a flange-retaining pocket 33, the bight of the strap 32 having an upwardly open vertical slot 34, which not only permits the flanged end of the cross shaft 20 to be lowered into its operative position but also permits the retaining flange 22 to be lowered into the flange-retaining pocket 33.

In the second position of the switch-blade assembly, the cross shaft 20 is spaced below the outer side of the switch contacts 9 and 10.

The means for mounting the switch blade assembly in its second position on the box 1 is identical with the means for mounting it in the first position except that the slot 40 for receiving the handle end portion of the shaft is mounted on the A wall of the box while the pocket-forming strap 42 for receiving the flange-retaining end portion of the shaft is mounted on the B wall, each being horizontally aligned with each other and with the operative shaft axis. Accordingly, such means includes: an A wall slot 40 having a downwardly-turned end portion 41; and a B wall strap 42 providing a pocket and an access slot corresponding to a pocket 33 and slot 34 respectively.

With the foregoing arrangement, the switch-blade assembly may be operatively mounted in either position in a manner permitting its easy and quick removal from and replacement into that position. Before passing, it may be noted that, in place of B wall slot 30 and A wall strap 32, the box 1 may be provided with a pair of identical or equivalent A and B wall slots 30. The same is true with respect to the A wall slot 40 and the B wall strap. In each case, the flange-retaining end portion of the cross shaft 20 should project through and slightly beyond its retaining flange.

Operation

The switch box 1 should always be installed upright when the incoming power lines pass downwardly to approach the top side of the installed box. In this case, it is a simple matter (a) to extend the incoming power line downwardly through suitable openings in the top of the box and connect them to the power-receiving terminals 7 and (b) to mount the cross shaft 20 in its first position where it extends across the box at a location spaced below the inner side of the contact 9. When installed in this way, it will, of course, meet the underwriters' requirements.

Where the incoming power lines approach the bottom side of the box location, the box is simply turned up-side-down and secured to the wall through bolt holes 18. The incoming lines are now extended upwardly through suitable openings in the bottom end of the up-side-down box 1 and connected to the incoming power-receiving terminals 7. Contemporaneously, the cross shaft 20 is mounted in its second position on box 1 so that it extends transversely below the outer side of the power contacts 9. When this is done, it will once more meet the underwriters' requirements.

With an arrangement of this character, the vertical direction from which the incoming power lines approach the fuse disconnect box location is unimportant. It is just as easy to mount the box upside-down as it is to mount it upright and just as easy to make the electrical connections when the box is upside-down as it is when the box is upright.

The conventional switch assembly is provided with spring means to "snap" the switch between open and closed positions. My switch is similarly provided with spring means, which are not shown.

Having described my invention, I claim:
1. An electrical fuse-disconnect box comprising:
(A) a switch box having a power-receiving end, which is adapted to receive an incoming electrical power line;
(B) insulatedly-mounted means in the box for transmitting incoming electrical power
   (1) from a power-receiving terminal adjacent said power-receiving end to one switch contact,
      (a) which has an outer side corresponding to said power-receiving end of the box and an opposite inner side, and
   (2) from another switch contact through a safety fuse to a power-delivering terminal;
(C) a switch blade assembly having
   (1) a switch blade for closing and opening an electrical connection between said switch contacts, and
   (2) a shaft for operating said switch blade;
(D) means for selectively mounting said box
   (1) in one installation, upright upon a wall with its power-receiving end uppermost, and
   (2) in another installation, upside down upon a wall with its power-receiving end lowermost; and
(E) means for removably mounting said switch blade assembly selectively upon said box for upward switch-closing and downward switch-opening movements,
   (1) in one position, when the box is upright, with said operating shaft located below the inner side of said one contact, and
   (2) in another position, when the box is upside down, with said operating shaft located below said outer side of said one contact.
2. The box of claim 1 wherein:
(A) said other switch contact, of said insulatedly-mounted means, is horizontally spaced from said one switch contact and has corresponding outer and inner sides; and
(B) said operating shaft, of said switch blade assembly, is located on the inner side of both switch contacts in said one position and on the outer side of both switch contacts in said other position.

References Cited by the Examiner
UNITED STATES PATENTS
3,141,947   7/1964   Daly et al. _____ 200—172

ROBERT K. SCHAEFER, *Primary Examiner.*

M. GINSBURG, *Assistant Examiner.*